United States Patent
Wei et al.

(10) Patent No.: US 12,452,773 B2
(45) Date of Patent: Oct. 21, 2025

(54) COMMUNICATIONS DEVICES, INFRASTRUCTURE EQUIPMENT AND METHODS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 385 days.

(21) Appl. No.: 18/029,097

(22) PCT Filed: Sep. 16, 2021

(86) PCT No.: PCT/EP2021/075432
§ 371 (c)(1),
(2) Date: Mar. 29, 2023

(87) PCT Pub. No.: WO2022/083948
PCT Pub. Date: Apr. 28, 2022

(65) Prior Publication Data
US 2023/0388904 A1    Nov. 30, 2023

(30) Foreign Application Priority Data

Oct. 19, 2020 (EP) ................................ 20202669

(51) Int. Cl.
*H04W 48/14* (2009.01)
*H04W 88/04* (2009.01)
*H04W 92/18* (2009.01)

(52) U.S. Cl.
CPC ............ *H04W 48/14* (2013.01); *H04W 88/04* (2013.01); *H04W 92/18* (2013.01)

(58) Field of Classification Search
CPC ...... H04W 48/14; H04W 88/04; H04W 92/18
See application file for complete search history.

(56) References Cited

U.S. PATENT DOCUMENTS

2018/0199266 A1* 7/2018 Pantelidou ............ H04W 48/14
2020/0187292 A1* 6/2020 Turtinen ............... H04L 5/0055
(Continued)

FOREIGN PATENT DOCUMENTS

WO    2018/194390 A1    10/2018

OTHER PUBLICATIONS

International Search Report and Written Opinion mailed on Jan. 4, 2022, received for PCT Application PCT/EP2021/075432, filed on Sep. 16, 2021, 17 pages.
(Continued)

*Primary Examiner* — Margaret G Webb
(74) *Attorney, Agent, or Firm* — XSENSUS LLP

(57) ABSTRACT

A communications device acting as a relay device receives a request for system information from another communications device via a sidelink interface between the communications device and the other communications device. The communications device acts as a relay device for the other communications device as a remote device, via which relay device the remote device can transmit data to or receive data from a radio network infrastructure equipment of a wireless communications network. The infrastructure equipment may be a first infrastructure equipment which forms a first cell of the wireless communications network via which the relay device can transmit the data to or receive the data from the wireless communications network.

18 Claims, 8 Drawing Sheets

(56) References Cited

U.S. PATENT DOCUMENTS

2021/0400489 A1* 12/2021 Starsinic ......... H04W 36/00226
2022/0377649 A1* 11/2022 Choi ................... H04W 48/12

OTHER PUBLICATIONS

3GPP, "3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746, v15.1.1, Apr. 2018, pp. 1-55.

3GPP, "3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746, v1.1.0, Aug. 2017, pp. 1-57.

3GPP, "3rd Generation Partnership Project; Technical Specification Group Radio Access Network; NR; NR and NG-RAN Overall Description; Stage 2 (Release 15)", 3GPP TS 38.300 V15.2.0, Jun. 2018, pp. 1-87.

OPPO, "New SID: Study on NR sidelink relay", 3GPP TSG RAN Meeting #86, RP-193253, Dec. 9-12, 2019, pp. 1-5.

Apple, "Discussion on Control Plane mechanisms for Layer 2 Relay", 3GPP TSG-RAN WG2 Meeting #111-e, R2-2007101, Aug. 17-28, 2020, 4 pages.

CATT, "User and Control Plane Procedures for L2 UE-to-NW Relay", 3GPP TSG-RAN WG2 Meeting #111-e, R2-2006610, Aug. 17-28, 2020, 7 pages.

Holma et al., "LTE for UMTS OFDMA and SC-FDMA Based Radio Access", John Wiley & Sons, 2009, 4 pages.

Huawei et al., "Correction to NR TC 6.1.2.11-Area Specific SIBs using systeminformationAreaID", 3GPP TSG-RAN5, Meeting #86-e, R5-201006, Feb. 17-28, 2020, 7 pages.

Huawei et al., "Study aspects of OE-to-Network relay and solutions for L2 relay", 3GPP TSG-RAN WG2 Meeting #111-e, R2-2008047, 12 pages.

Mediatek Inc, "RRC States for Relaying", 3GPP TSG-RAN WG2 Meeting #111 electronic, R2-2006571, Aug. 17, 28, 2020, 9 pages.

* cited by examiner

COMMUNICATIONS DEVICES, INFRASTRUCTURE EQUIPMENT AND METHODS

CROSS-REFERENCE TO RELATED APPLICATIONS

The present application is based on PCT filing PCT/EP2021/075432, filed Sep. 16, 2021, which claims priority to European Patent Application No. 20202669.6, filed Oct. 19, 2020, the entire contents of each are incorporated herein by reference.

BACKGROUND

Field

The present disclosure relates to communications devices, infrastructure equipment and methods for the transmission of data via a sidelink of a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

In order to reduce power consumption, make efficient use of available spectrum, and/or for any other reason, communications devices may be configured to communicate using a sidelink connection with, or via, a relay communications device. However, this gives rise to new challenges for efficiently handling communications in wireless telecommunications systems that need to be addressed.

SUMMARY

The present disclosure can help address or mitigate at least some of the issues discussed above.

Embodiments of the present technique relate to and can provide a communications device or a method of operating a communications device. The method can includes receiving a request for system information from another communications device via a sidelink interface between the communications device and the other communications device. The communications device acts as a relay device for the other communications device as a remote device, via which relay device the remote device can transmit data to or receive data from a radio network infrastructure equipment of a wireless communications network. The infrastructure equipment may be a first infrastructure equipment which forms a first cell of the wireless communications network via which the relay device can transmit the data to or receive the data from the wireless communications network. The request for the system information received from the remote device includes an indication of a cell of a radio network part of the wireless communications network for which the remote device is requesting the system information, which cell may be the first cell (same cell) or a second cell (different cell). The method includes identifying, from the indication of the cell for which the remote device is requesting the system information, whether a system information area of the cell for which the remote device is requesting the system information is the same as a system information area of the cell, via which the relay device can transmit the data to or receive the data from the wireless communications network. The method includes determining whether to respond to the request for the system information based on whether the system information areas of the relay device and the remote device are the same or different. For example, the first cell and the second cell may form different parts of the radio network of the wireless communications network and therefore require different area specific system information or area specific system information blocks (SIBs).

For example, the method may include identifying that the system information area of the radio network of which the second cell for which the remote device is requesting the system information is different to a system information area of the first cell of the radio network part, via which the relay device can transmit the data to or receive the data from the wireless communications network. If the system information areas are different, the method may include transmitting a request for the system information for the remote device to the first infrastructure equipment, the request indicating the second cell for which the remote device is requesting the system information, and receiving the system information for the remote device from the first infrastructure equipment, and transmitting the system information to the remote device. The system information may therefore include area specific system information related to the system information area of the radio network of which the second cell forms part.

In some examples, the first infrastructure equipment may retrieve the system information for the second cell from a second infrastructure equipment forming the second cell by receiving the information in response to a request transmitted and the response received via an interface between the first and the second infrastructure equipment (Xn interface).

Accordingly, example embodiments can provide a remote device communicating via a relay device, which may acquire system information for a coverage area of a cell in which it is located from a relay device located in a coverage area of a different cell, the cells forming different parts of a radio network of a wireless communications network.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution (LTE) Wireless Communications System

Figure 1:
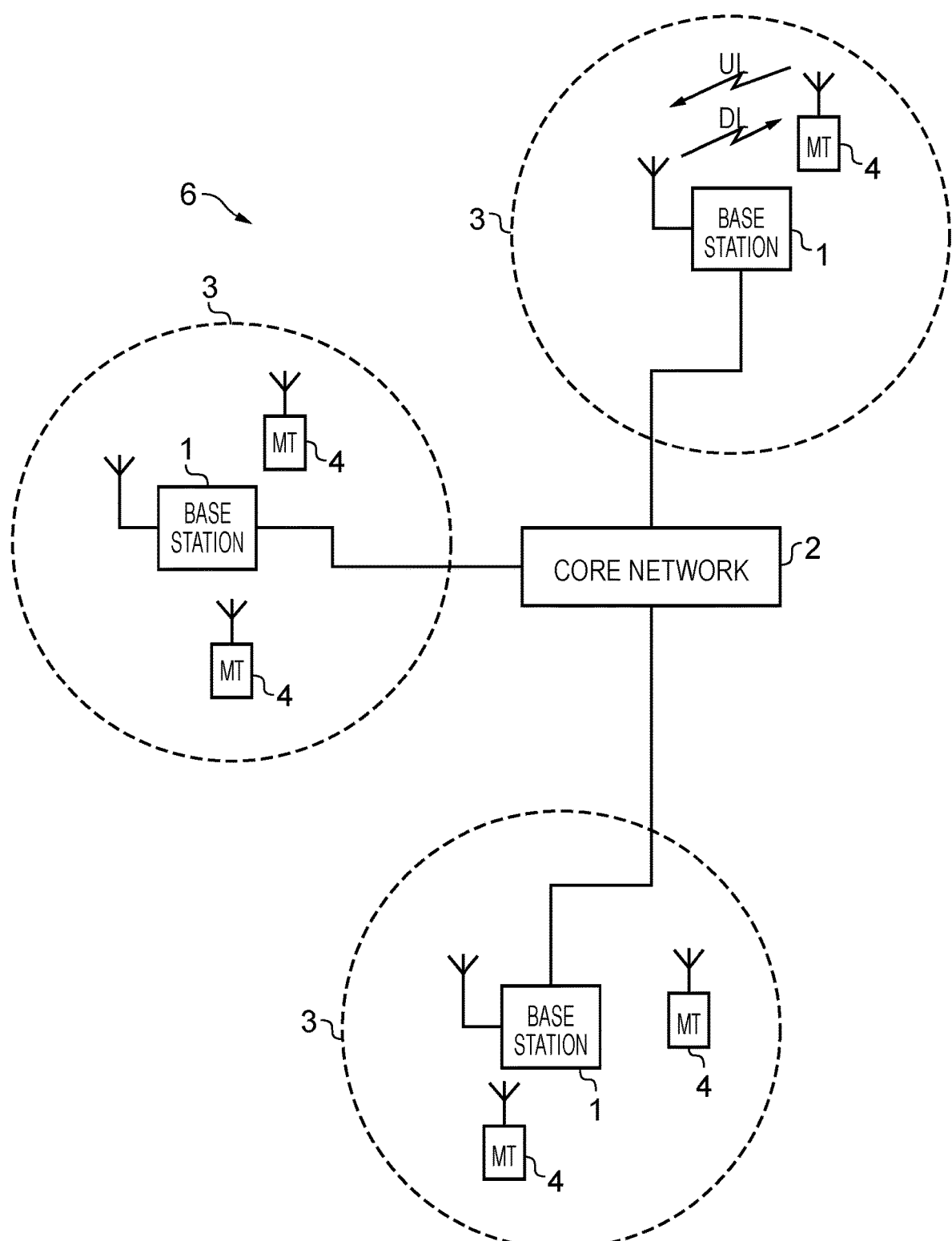
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
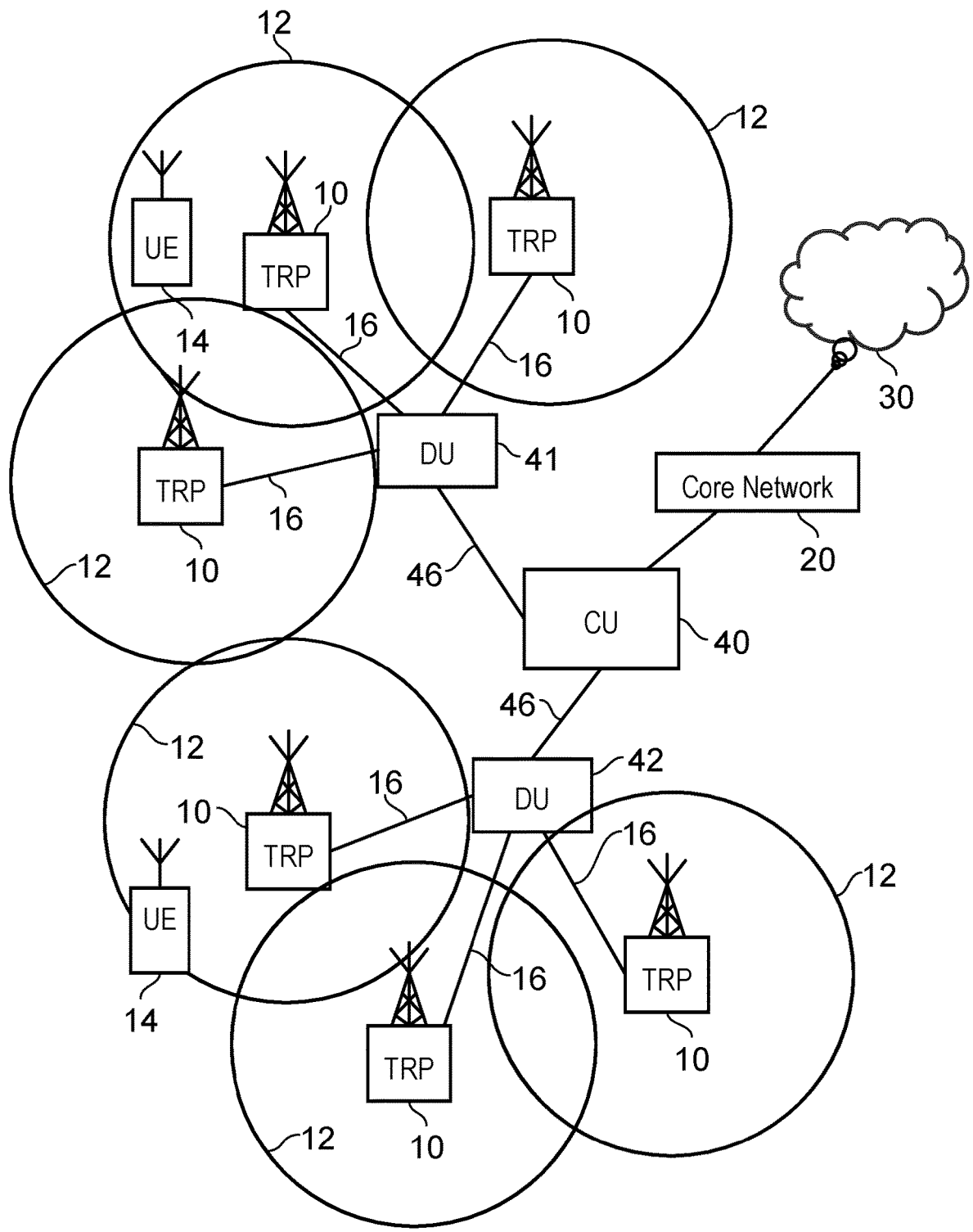
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for NR and 5G is shown in FIG. 2. 3GPP have worked to define a New Radio Access Technology (NR) [1]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Conventionally, in a cellular communications network, a wireless communications device (such as the communications devices 4 of FIG. 1 and the communications devices 14 of FIG. 2) which may be mobile, communicates directly with infrastructure equipment of the network (such as base stations 1 of FIG. 1 and TRPs 10 of FIG. 2). Examples of such infrastructure equipment include base stations which in specific contexts may be referred to as nodeBs, eNodeBs (eNBs) or gNodeBs (gNBs).

This direct communication may be via a wireless access interface which uses communication resources under the full or partial control of the network. In particular, the communication resources may use carrier frequencies which may be licensed, or 'operator managed' in the geographic area covered by the network.

However, it has also been proposed that communications devices may communicate directly between each other, either using licensed spectrum or unlicensed spectrum. This type of communication may generally be referred to as 'device-to-device' (D2D) communication, and may include the case where the device-to-device communication is provided in order to allow a 'remote' communications device to transmit or receive data from the network via a 'relay' communications device (whether or not the remote communications device is within communications range of an infrastructure equipment of the network).

In other scenarios, device-to-device communication may permit communications devices to communicate data directly between each other, without the data traversing any infrastructure equipment of the network. This latter scenario may permit, for example, communication between devices where there is no coverage of any infrastructure equipment.

A wireless access interface which is used for device-to-device communication is herein referred to as a sidelink.

An example scenario in which embodiments of the present technique may be deployed is a personal internet of things "PIoT" network. A PIoT network may comprise one or more PIoT devices communicating between themselves and a 'master user equipment (UE)'. The master UE may be a smartphone, residential gateway, or the like, and may provide connectivity to a cellular network, such as a 3GPP 5G radio access network. Connections within the PIoT network may be by means of device-to-device communication, and the master UE may act as a relay. Where the master UE or 'gateway UE' connects to a 5G network, the master UE may be referred to in some scenarios as a 5G residential gateway (5G-RG).

Figure 3:
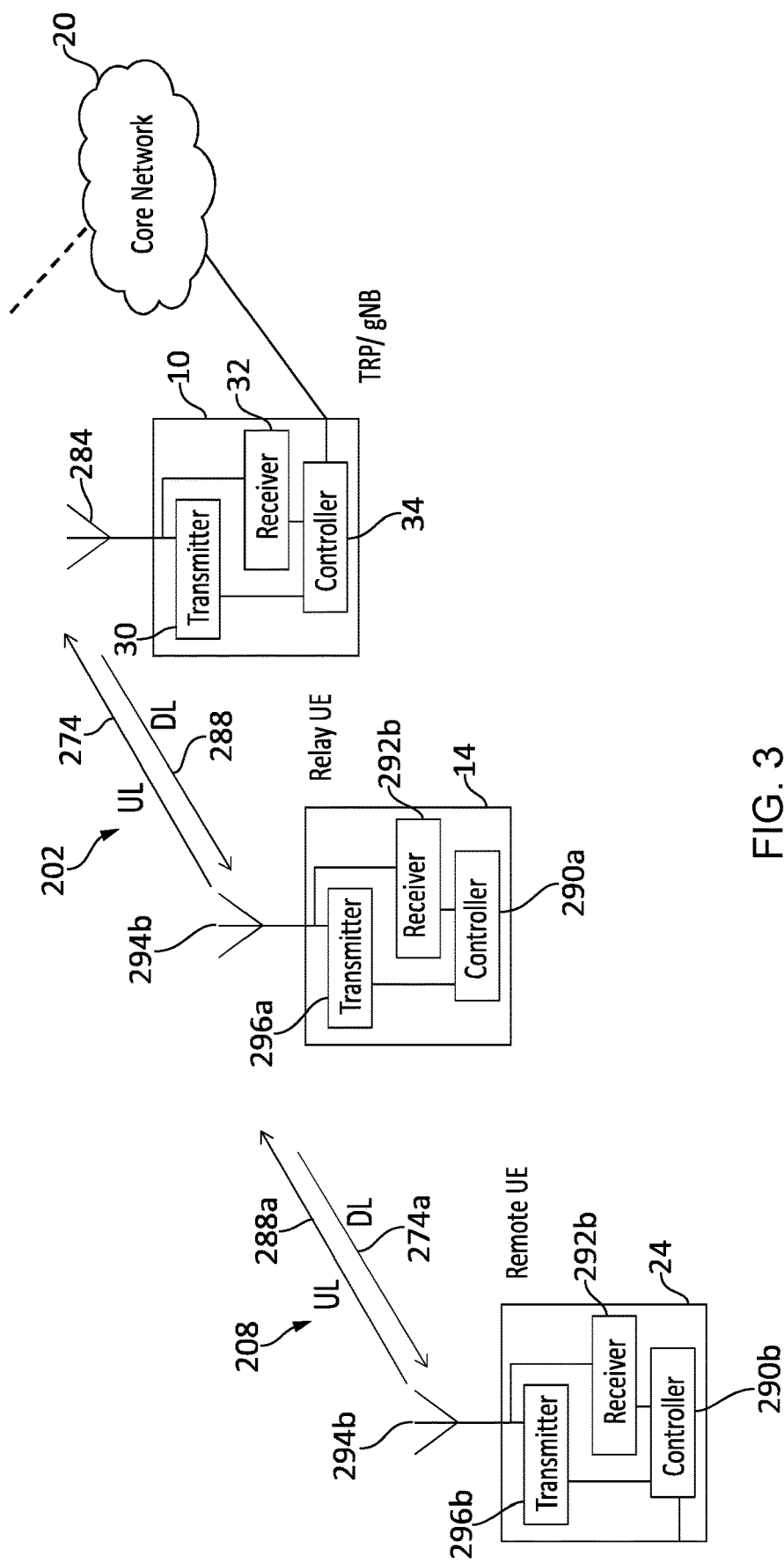
FIG. 3 is a schematic block diagram of example infrastructure equipment and a communications device acting as a relay device and another communications device acting as a remote device in accordance with example embodiments.

FIG. 3 illustrates in more details communications devices and infrastructure equipment which may be adapted in accordance with embodiments of the present technique, and in particular illustrates the use of a sidelink for device-to-device communications.

In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more communications devices via a wireless access interface via an antenna 284.

In FIG. 3, an example communications device 14 is shown, which communicates with the TRP 10 via the wireless access interface by transmitting signals on an uplink 274 and receiving signals on a downlink 288. The example communications device or UE 14 acts as a relay UE to a second communications device 24, which will be referred to as a remote UE. The wireless access interface 202 via which signals may be transmitted on the uplink 274 and signals may be transmitted on the downlink may be in accordance with a Uu interface of a 3GPP specification.

For communicating via the wireless access interface, the relay UE 14 comprises a wireless transmitter 296a and a wireless receiver 292a, which are connected to an antenna 294a and are controlled by a controller or controlling processor 290a.

The wireless transmitter 296a, wireless receiver 292a and antenna 294a allow the relay UE 14 to communicate via the wireless access interface provided by the TRP 10.

As shown in FIG. 3 the relay UE 24 also includes a wireless transmitter 296b and a wireless receiver 292b, which are connected to an antenna 294b and are controlled by a controller or controlling processor 290b. As will be appreciated the transmitter 296b, the receiver 292b and the controller 290b may operate in the same way as the corresponding transmitter 296a, receiver 292a and controller 290a of the relay UE 14. However the transmitter 296b, the receiver 292b and the controller 290b of the relay UE 24 are configured with the transmitter 296a, receiver 292a and controller 290a of the relay UE 14 to transmit uplink signal 288a and downlink signals 274a via a sidelink wireless access interface 28 formed between the remote UE 24 and the relay UE 14. The sidelink 208 may use communication resources in licensed or unlicensed spectrum, or a combination of both, as will be further described below.

As will be explained below, in some scenarios, the remote UE 24 may be within range of the TRP 10, and accordingly may additionally communicate directly with the TRP 10 using the wireless access interface provided by the TRP 10.

The transmitters 296a, 296b, 30 and the receivers 32, 292a, 292b (as well as other transmitters, receivers and transceivers described in relation to examples and embodiments of the present disclosure) may include radio frequency filters and amplifiers as well as signal processing components and devices in order to transmit and receive radio signals in accordance with a particular standard. For example, the transmitters 296a, 30 and the receivers 32, 292a, for allowing communication via the uplink 274 and downlink 288 of the wireless access interface provided by the TRP 10 may be configured in accordance with the 5G/NR standard. The second transmitters 296b and the second receivers 292b, for allowing communication via the a sidelink using unlicensed spectrum may be configured in accordance with a Bluetooth® or IEEE 802.11/WiFi® standard.

The controllers 34, 290 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Not shown in FIG. 3, the TRP 10 also includes a network interface, which connects to a DU (such as the DU 42 shown in FIG. 2) via a physical interface. The network interface therefore provides a communication link for data and signalling traffic from the TRP 10 via the DU 42 and the CU 40 to the core network 20.

The interface between the DU 42 and the CU 40 may be known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

FIG. 3, the relay UE 14 is connected to the core network via infrastructure equipment (TRP 10) providing a wireless access interface, the TRP 10 being connected directly to the core network 20.

In some embodiments, the connection between the relay UE 14 and the core network may be via a wireless backhaul interface provided by an infrastructure equipment. In an example of such an arrangement, the relay UE 14 may function as an 'integrated access and backhaul' (IAB) node. As in FIG. 3, the relay UE 14, acting as a relay, may be a gateway, a 5G-RG and/or a master UE.

Communicating System Information to Remote UE by Relay UE

Example embodiments described below relate to and provide improvements in communicating system information to remote UEs from relay UEs. System information is transmitted by a wireless communications network and required by UEs operating with the wireless communications network in order for the UEs to acquire parameters with which to configure their transmitters and receivers to transmit signals and receive signals respectively via a wireless access interface provided by the wireless communications network. According to some 3GPP standards, as part of an initial access phase, a UE may detect one or more Synchronisation Signal Blocks (SSBs). Each SSB contains a primary synchronisation signal (PSS), a secondary synchronisation signal (SSS) and a Physical Broadcast Channel (PBCH). After receiving the one or more SSBs, the UE decodes the SSBs. Decoding the SSBs allows the UE to achieve time and frequency synchronisation with the network by using the synchronisation signals within the SSBs. Decoding the SSBs also allows the UE to receive a master information block (MIB) in each of the PBCHs to receive control resources required for decoding System Information Block 1 (SIB 1). For example, the MIBs may provide information on control resource set (CORESET) #0 resource element number 0. It will be appreciated by one skilled in the art that CORESET #0 is a set of physical resources in 5G/NR which is used to carry a Physical Downlink Control Channel (PDCCH) for SIB1 scheduling.

As part of the initial access phase, the UE may search for and decode the PDCCH within CORESET #0 for scheduling information to receive a Physical Downlink Shared Channel (PDSCH) for SIB1. The PDCCH may contain information on a location of the resources and so on. SIB1 contains radio resource configuration information that is common for all UEs that are served by the gNB (except information applicable to unified access control as will be appreciated by one skilled in the art). SIB1 also defines a scheduling of other system information, contained in one or more other SIBs (e.g. SIB1 to SIB14) as will be appreciated by one skilled in the art. The scheduling information therefore identifies time and frequency resources of the wireless access interface where the system information such as SIB1 is transmitted.

As part of the initial access phase, the UE may read the other system information in one or more SIB blocks based on the information obtained from SIB1. Using the system information, the UE may determine whether a cell of the gNB/TRP is a suitable cell for the UE. For example, the UE may determine whether the cell of the gNB/TRP is a cell suitable for the UE based on a Public Land Mobile Network Identification (PLMN ID) and/or access class barring flags or the like as will be appreciated by one skilled in the art. In addition, the UE may obtain parameters for a RACH procedure from the system information. For example, the system information may include one or more of: Physical Random Access Channel (PRACH) preambles which should be used in a RACH procedure, PRACH formats which should be used in the RACH procedure, locations of PRACH in time and frequency or the like as will be appreciated by one skilled in the art.

The system information may also be area specific. That is to say, the configuration of the wireless access interface identified to the UEs by the system information may effect one or more cells supported by different infrastructure equipment (gNB/TRP) associated with a particular area. Furthermore, the system information may change from time to time and so a UE needs to ensure that it receives, and is configured with, the latest system information. As such, when a UE is within a radio coverage area provided by an infrastructure equipment (gNB/TRP), the UE can receive the latest information, which is periodically broadcast by the wireless communications network or transmitted on-demand. However how does a remote UE, which is communicating via a wireless communications network via a relay UE, and is out of coverage of the wireless communications network, receive system information?

Example embodiments described below aim to provide improvements in communicating system information to remote communications devices (UEs) which are transmitting and/or receiving data via a relay communications device (UE) to and/or from a wireless communications network.

Figure 4:
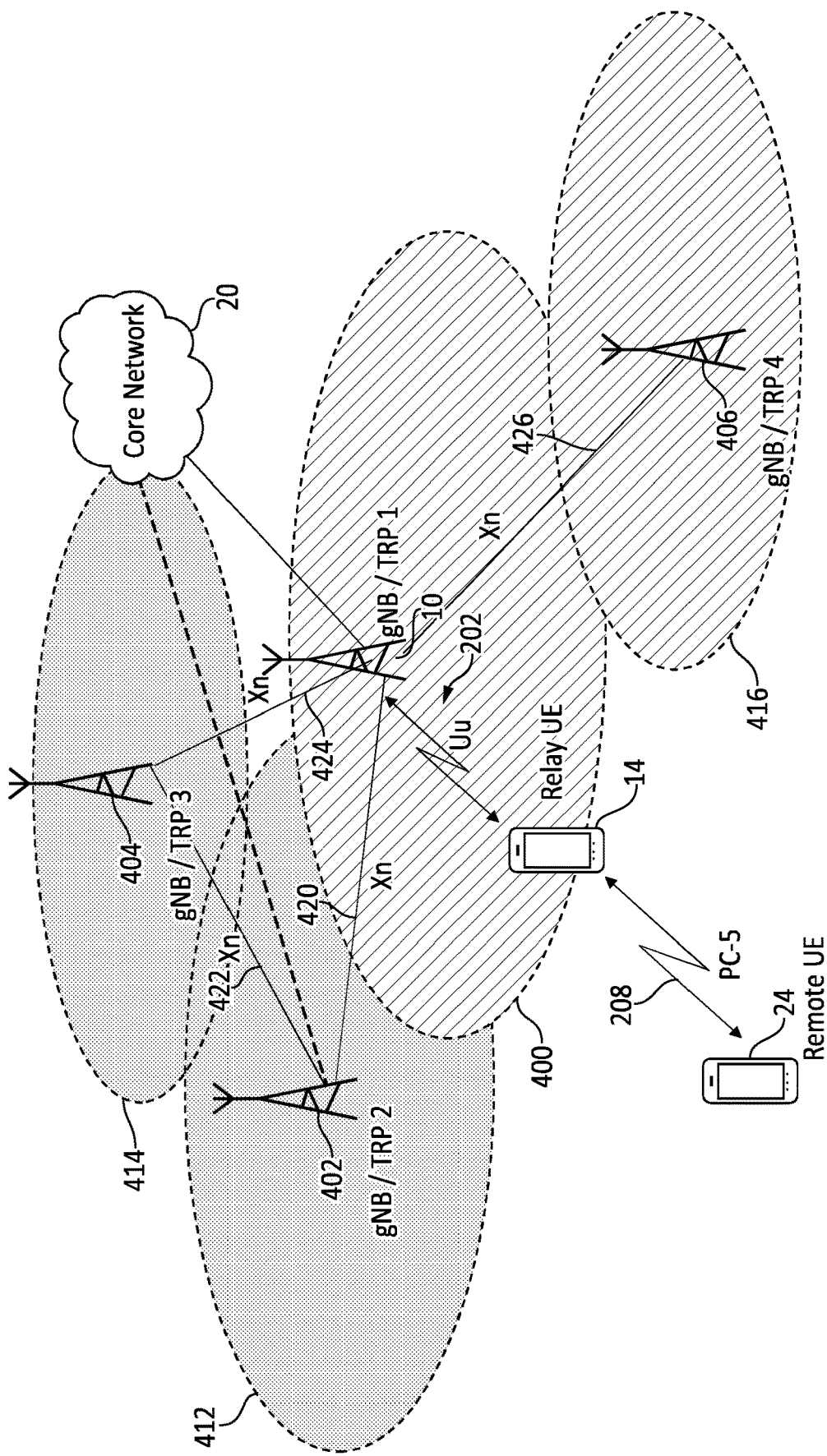
FIG. 4 is a schematic block diagram illustrating an example in which a relay device and a remote device of FIG. 3 are communicating using a wireless communications network including a plurality of radio network infrastructure equipment.
Figure 5:
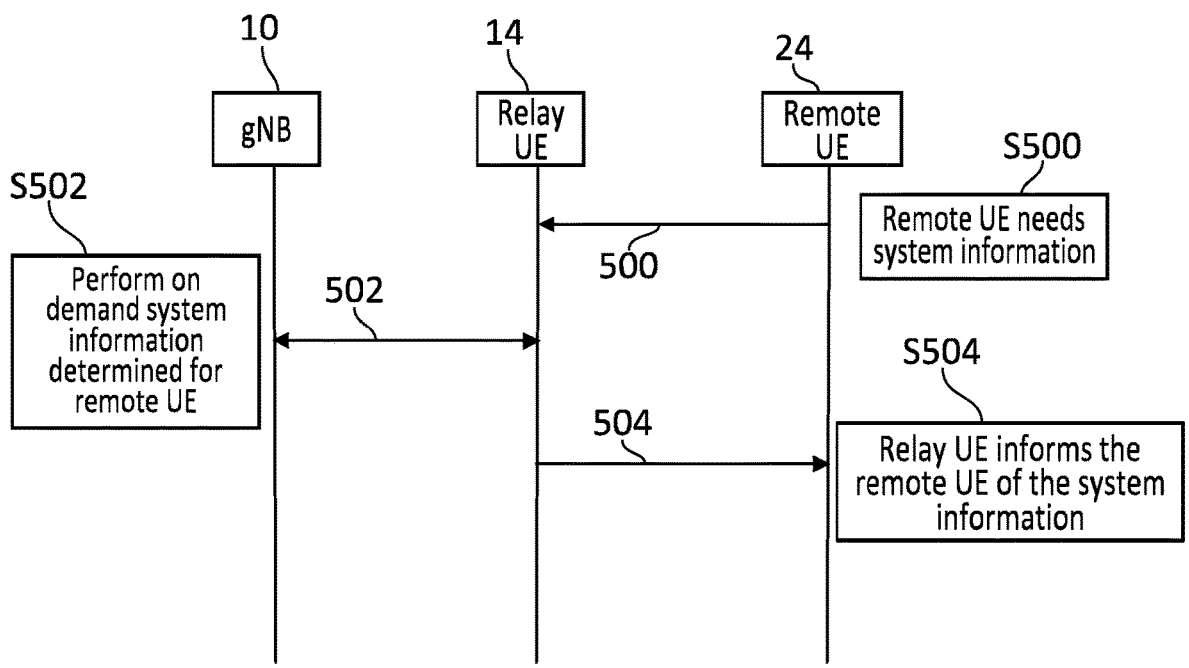
FIG. 5 is a combined process and message sequence chart in which a remote device requests and receives system information from the relay device of FIG. 4 via sidelink wireless access interface.

Example embodiments can be better appreciated from a scenario illustrated by the block diagram of FIG. 4 and the message flow diagram of FIG. 5, where corresponding features shown in FIGS. 1, 2 and 3 have the same numerical designations. In FIG. 4, the remote UE 24 and relay UE 14 of FIG. 3 are shown without their detailed structure operating with a wireless communications network. As shown in FIG. 3, the remote UE 24 is transmitting and receiving via a sidelink wireless access interface 208, which may be a PC-5 interface. The relay UE 14 is transmitting and receiving via a wireless access interface provided by a first infrastructure equipment (gNB/TRP) 10, which forms part of radio network infrastructure equipment of a wireless communications network. The first gNB/TRP 10 provides the wireless access interface within a radio coverage forming a cell of the radio network as represented by a dashed line 400. As illustrated by the example of FIG. 4, the radio network infrastructure network also includes a second gNB/TRP 402, a third gNB/TRP 404 and a fourth gNB/TRP 406, each of which has corresponding components and operates in a similar way to the first gNB/TRP 10 and so will not be described further. The second gNB/TRP 402 forms a second cell represented by a dashed line 412, the third gNB/TRP 404 forms a third cell represented by a dashed line 414 and the fourth gNB/TRP 406 forms a fourth cell represented by a dashed line 416.

As shown in FIG. 4 and according to a conventional arrangement an interface 420, 422, 424, 426 may be provided between each of the first, second, third and fourth gNB/TRP 10, 402, 404, 406 which may be for example an Xn interface. The Xn interface 420, 422, 424, 426 is provided so that gNB/TRPs can communicate signalling information between each other without going via the core network 20, for use for example in assisting handover.

As will be explained below, according to some example embodiments, the first and second cells 400, 412 may form a different area of the wireless communications network in the sense that the wireless access interface may be configured differently and so will require different system information in order for a UE to communicate via a wireless access interface provided by the second gNB/TRP 402. As shown in FIG. 4 the cells 400, 416 formed by the first and the fourth gNB/TRP 10, 406 may form a different area of the radio network to the second and the third cells 412, 414 formed by the second gNB/TRP2 and the third gNB/TRP3 402, 404 and so are shown with different shading representing an area of the radio network to which they belong. As explained below, each of the cells represent different areas of the radio network a UE transmitting and receiving via the corresponding gNB/TRP will require different area specific system information.

FIG. 5 provides an example procedure in which a remote UE 24 can acquire system information from a wireless communications network via a relay UE 14. As shown in FIG. 5, if a remote UE needs to acquire system information and does not have a connection with a gNB/TRP within a cell, the remote UE 24 determines in a first step S500 that it needs to acquire system information from the wireless communications network. This may be because a periodic update has been determined after a timer has expired or if the UE determines this it does not have a direct wireless access interface with the gNB/TRP 10 and so relies on the relay UE 14. The remote UE 24 therefore transmits a request for system information 500 to the relay UE14. The relay UE 14 then exchanges messages 502 as part of a procedure S502 to acquire on demand system information from the gNB/TRP 10 for the remote UE 24. As part of this procedure S502, the relay UE and the gNB/TRP 10 may exchange Radio Resource Control (RRC) signalling messages 502 for the relay UE 14 to acquire the system information for the remote UE 24. Then, having acquired the system information for the remote UE 24, from the gNB/TRP 10, the relay UE 14 performs a procedure S504 to transmit the system information 504 to the remote UE 24.

Area Specific System Information

According to the example of FIG. 5, a 3GPP NR system may be configured to provide a communications device (UE) with system information on demand. That is to say that the UE can request system information from the network, such as a gNB/TRP 10 and be provided with that system information. Furthermore any system information provided in a system information (SIB) block can be configured to be cell specific or area specific, with an indication in a field in the IE systeminformationAreaID in system information block 1 (SIB1). The area specific SIB is applicable within an area referred to as a system information area. The system information area may consist of one or several cells.

Example embodiments can adapt the procedure represented in FIG. 5 to provide a remote UE with area specific system information. In the following description the terms system information and SIBs may be used interchangeably.

Embodiments explained below can provide a communications device or a method of operating a communications device, which can include operations of receiving a request for system information from another communications device via a sidelink interface between the communications device and the other communications device. The communications device acts as a relay UE for the other communications device as a remote UE, via which relay UE the remote UE can transmit data to or receive data from a gNB/TRP. The gNB/TRP which may be a first gNB/TRP forms a first cell of a wireless communications network via which the relay UE can transmit the data to or receive the data from the wireless communications network. The request for the system information received from the remote UE includes an indication of a cell of a radio network part of the wireless communications network for which the remote UE is requesting the system information, which cell may be the first cell (same cell) or a second cell (different cell). The method includes identifying, from the indication of the second cell for which the remote UE is requesting the system information, whether an area of the radio network part of the wireless communications network of which the second cell is the same as an area of the radio network part of the first cell. The method includes determining whether to respond to the request for the system information based on whether the areas of the relay UE and the remote UE are the same or different.

For example, the method may include identifying that the area of the radio network of the second cell is different to an area of the first cell of the radio network. If the areas are different the method may include transmitting a request for the system information for the remote UE to the first gNB/TRP, the request indicating the second cell for which the remote UE is requesting the system information, and receiving the system information for the remote UE from the first gNB/TRP, and transmitting the system information to the remote UE. The system information may therefore include area specific system information related to the area of the radio network of which the second cell for which the remote UE is requesting the system information forms part.

In some examples, the first gNB/TRP may retrieve the system information for the second cell from the second gNB/TRP forming the second cell by receiving the information in response to a request transmitted and the response received via an interface between the first and the second gNB/TRP (Xn interface).

According to example embodiments a remote UE communicating via a relay UE may acquire system information for a coverage area of a cell in which it is located from a relay UE located in a coverage area of a different cell, the cells forming different parts of a radio network of a wireless communications network.

Example Embodiment Remote UE and Relay UE in Coverage Area of the Same Cell

Figure 6:
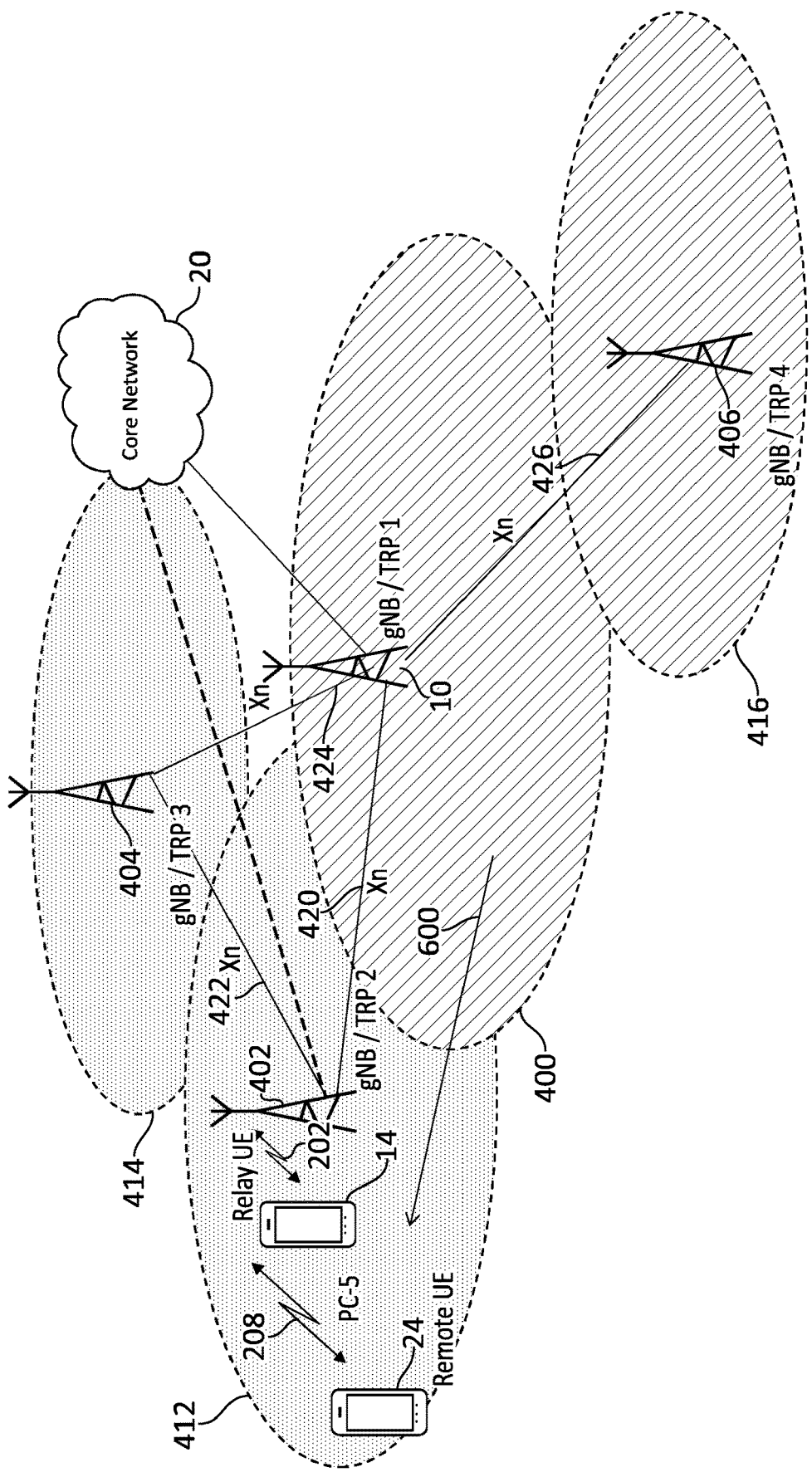
FIG. 6 is a schematic block diagram illustrating an example in which a relay device and a remote device of FIG. 4 are communicating using a wireless communications network including a plurality of radio network infrastructure equipment, in which the relay device and the remote device are operating in a radio coverage area provided by the same cell according to an example embodiment.

A first example scenario illustrating an example embodiment is shown in FIG. 6, where elements and aspect shown in FIG. 4 have the same numerical designations. The elements shown in FIG. 6 are the same as those shown in FIG. 4 and so to avoid repetition these will not be described again except for the illustrated in differences. As shown in FIG. 6, compared with FIG. 4, in the first example scenario the remote UE 24 and the relay UE 14 have both moved to be within a radio coverage area 412 formed by the second gNB/TRP 402.

The first example scenario illustrated in FIG. 6 corresponds to scenario 4 in TR36.746 V1.1.0 [3] the content of which are incorporated herein by reference. According to the example shown in FIG. 6, both the relay UE 14 and the remote UE 24 are within a radio coverage area of the same gNB/TRP 402. For example the relay UE 14 and the remote UE 24 may have moved together from the first cell 400 formed by the first gNB/TRP1 10 to the second cell 412, as represented by the arrow 600, and the relay UE 14 attaches the second gNB 402.

According to example embodiments, the relay UE 14 monitors the system information, and more particular area specific system information or update system information and communicates the area specific or update system information to the remote UE 24. Although the remote UE 24 is within coverage, it may not have a symmetrical communications capability, for example, it may be able to detect some downlink transmitted information from the gNB/TRP1 10 but may not be able to make uplink communication.

According to this example embodiment the remote UE 24 informs the relay UE 14 of the system information/SIBs which it requires to operate in the new cell 412. For example, the remote UE 24 may transmit a required SIBs to the relay UE 14. The relay UE either proceeds to acquire system information by monitoring for SIBs in the new cell or upon request from the remote UE 24, the relay UE14 acquires the system information, including any area specific system information. If the system information or the area specific system information has not changed, then the relay UE 14 either does nothing, which is recognised by the remote UE 24 as indicating that there has been no change in the area specific system information or an update of the system information, or the relay UE 14 explicitly indicates to the remote UE 24 that there has been no change in the area specific system information or update to the system information. However, if the relay UE 14 receives an indication of area specific system information which is required by the remote UE 24, which is different to area specific system information which it has received from the gNB/TRP2 402, then the relay UE 14 informs the remote UE 24 of the area specific system information, which it has received from the gNB/TRP2 402. The relay UE 14 may communicate the request for the area specific system information to the gNB/TRP2 402, which may respond by providing the system information to the relay UE14 for communication to the remote UE 24.

Alternatively, the relay UE 14 may have stored the system information, including the area specific system information, with an identifier of the system information, so that when it receives the request from the remote UE 24, the relay UE 14 can respond to the request without communicating separately the request the gNB/TRP2 402.

There are various ways in which the relay UE 24 can communicate the area specific system information to the remote UE 14. For example

- the relay UE 14 may receive the updated/area specific system information/SIB on behalf of the remote UE and then use dedicated RRC signalling message via the sidelink interface 208 (PC5-RRC) to communicate the updated/area specific system information/SIB to the remote UE 24. This alternative has an advantage when the updated SIB concerns only a small number of remote UEs;
- the relay UE 14 receives from the gNB/TRP 10, which in turn was discerned from the second gNB/TRP 402, scheduling information defining time and frequency communications resources of a wireless access interface of the second cell provided by the second gNB/TRP 402 in which newly defined updated/area specific system information/SIB will be broadcast by the second gNB/TRP2 402, the remote UE 24 thereafter receiving the broadcast SIB itself from the second cell 402;
- the relay UE receives the updated SIB on behalf of remote UE and then broadcast on its own broadcast channel provided on the sidelink (PC5). This alternative has advantage when the updated SIB is related with a number of remote UEs.

The remote UE 24 stores the related SIBs together with an indication of its area specific system information ID and transmits a request to the relay UE 14 after it expires. Alternatively, since the example scenario of FIG. 6 is within coverage, the remote UE 24 may detect that it has changed cell or detects the area of the cell, which can be used by the remote UE24 to trigger a request for update from the relay UE 14. The remote UE 24 can then communicate the area specific system information, which it acquires from the relay UE14.

Figure 7:
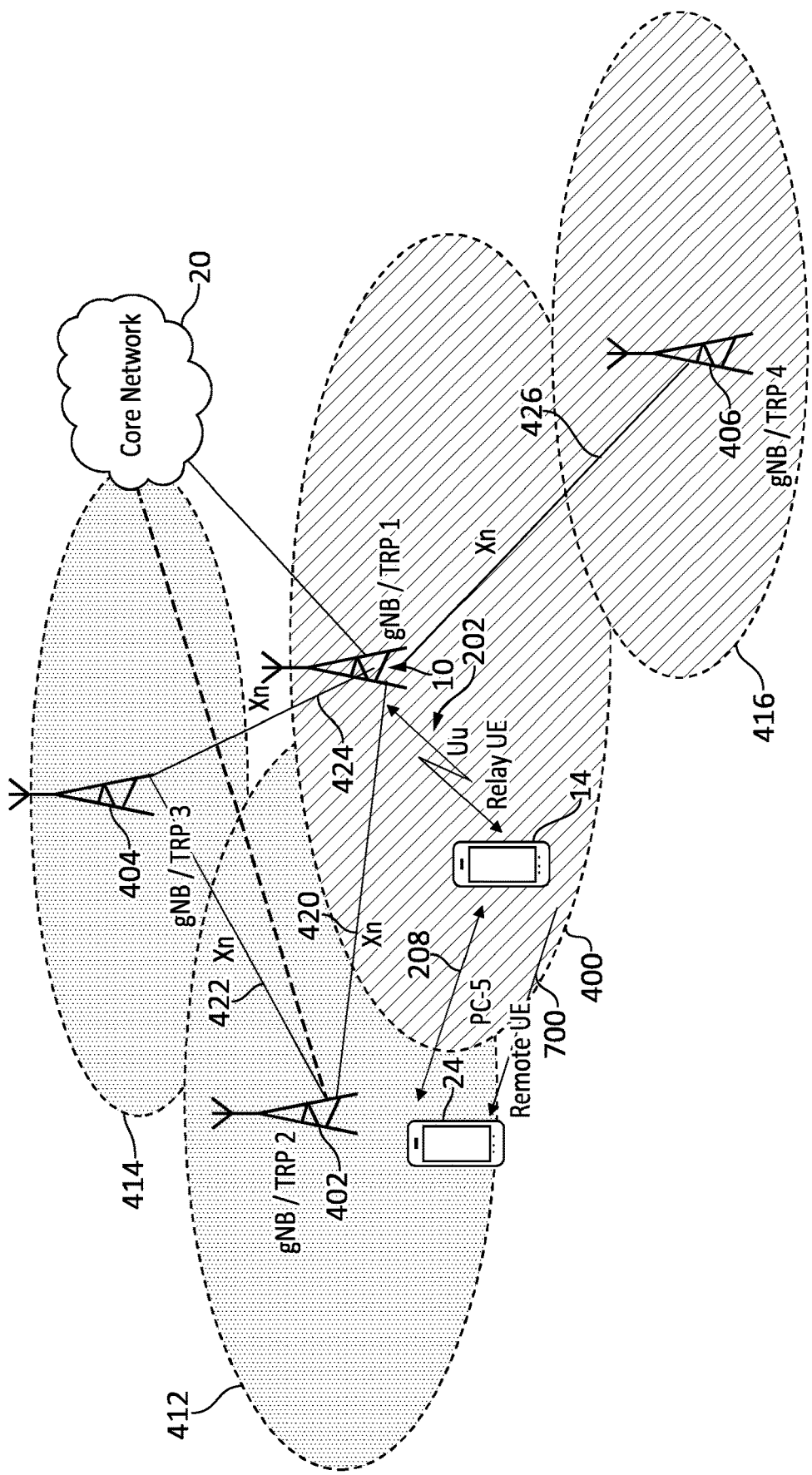
FIG. 7 is a schematic block diagram illustrating an example of in which a relay device and a remote device of FIG. 4 are communicating using a wireless communications network including a plurality of radio network infrastructure equipment, in which the relay device and the remote device are operating in a radio coverage area provided by different cells according to an example embodiment.
Figure 8:
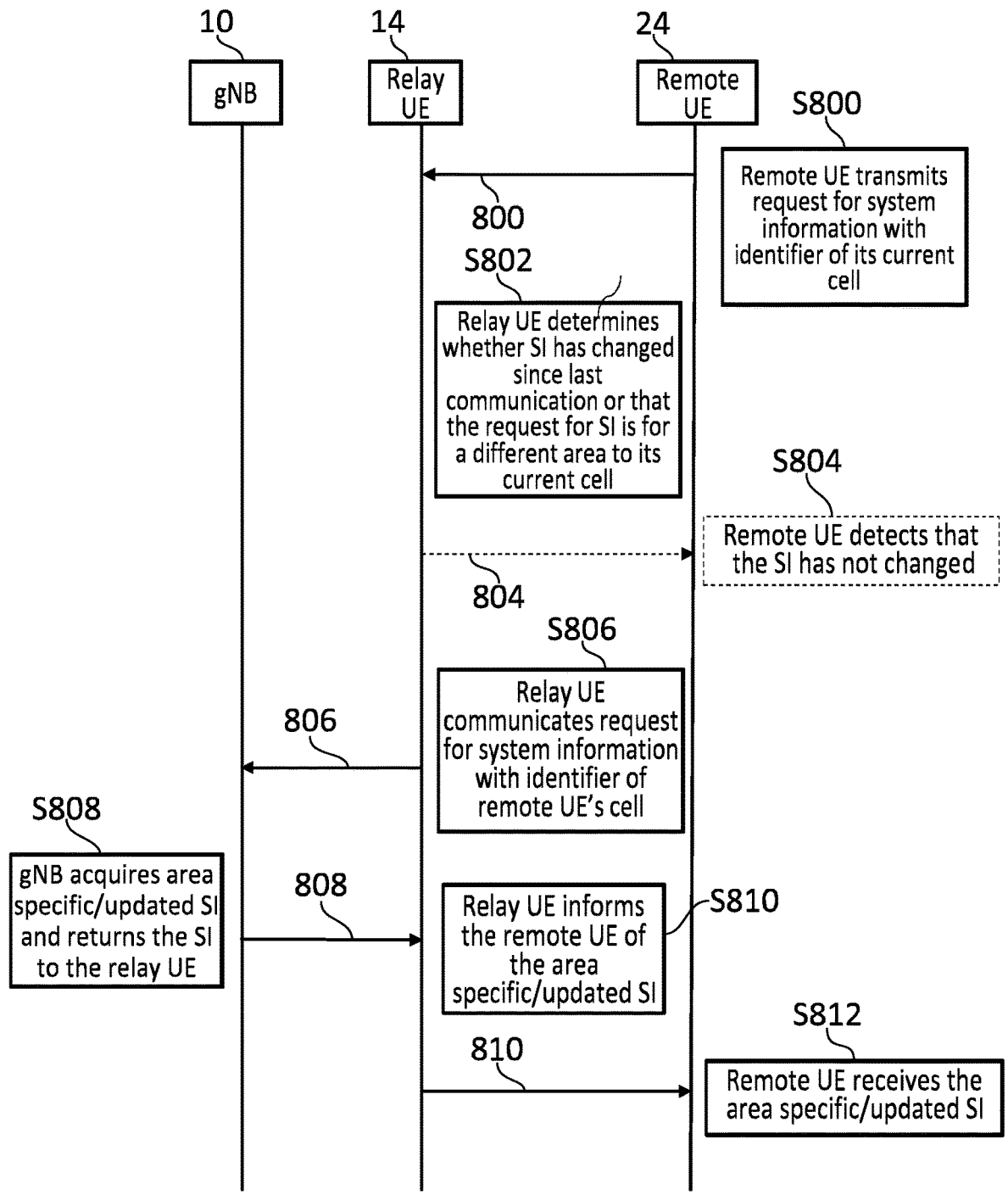
FIG. 8 is a combined process and message sequence chart for a relay device and a remote device operating with an infrastructure equipment according to an example embodiment.

Example Embodiment Remote UE and Relay UE in Coverage Area of the Different Cells A second example scenario illustrating an example embodiment is shown in FIG. 7, where elements and aspect shown in FIGS. 4 and 6 have the same numerical designations. The elements shown in FIG. 7 are the same as those shown in FIGS. 4 and 6 and so only the differences will be described. As shown in FIG. 7, compared with FIGS. 4 and 6, in the second example scenario the remote UE 24 has moved to a radio coverage area 412 formed by the second gNB/TRP 402, whereas the relay UE 14 is within the radio coverage area 400 of the first gNB/TRP 10. Thus the relay UE 14 is served by a different gNB/TRP1 10 to the remote UE 24 which is served by the second gNB/TRP2 402. Furthermore as explained above the second gNB/TRP2 402 belongs to a different part of the radio network to the first gNB/TRP1 10 and so requires different area specific system information for a UE to communicate via the second gNB/TRP2 402 than the first gNB/TRP1 10.

The second example scenario illustrated in FIG. 7 corresponds to scenario 5 in TR36.746 V1.1.0 [3]. According to the example shown in FIG. 7, the relay UE 14 and the remote UE 24 are within different radio coverage areas 400, 412, the remote UE 24 having moved for example separately from, the relay UE as represented by an arrow 700.

As with the first example scenario, in the second scenario, the remote UE 24 informs the relay UE 14 of the system information/SIBs which it requires to operate in the new cell 412. For example, the remote UE 24 may transmit a request for the SIBs the remote UE requires, with its associated cell id e.g. second cell id, and/or systeminformationAreaID indicator to the relay UE 14. In contrast to the first example, in the second example, the relay UE does not have the area specific system information, because the first cell 400 served by the first gNB/TRP1 10 is in a different part of the radio network to the second cell 402 served by the second gNB/TRP 402. According to this example, the relay UE 14 transmits a request for the area specific system information or update for system information to its serving gNB/TRP1 10. This request may include an indication of the required SIBs, and a target cell id.

If an area identifier for the area specific system information (systeminformationAreaID) is different between the cells 400, 412 or the system information (SIBs) provided by the second gNB/TRP2 402 forming the cell 412 serving the remote UE 24 has changed, then the gNB/TRP1 10 serving the relay UE 14 sends a request via the Xn interface 420 to the second gNB/TRP 402 to receive the area specific/updated system information. The gNB/TRP2 402 serving the remote UE 24 returns the area specific/updated system information to the gNB/TRP1 10 serving the relay UE 14 via the Xn interface 420. As before the relay UE 14 then communicate the area specific/updated system information to the remote UE 24.

As for the first example scenario, if the system information or the area specific system information has not changed, then the relay UE 14 either does nothing, which is recognised by the remote UE 24 as indicating that there has been no change in the area specific system information or an update of the system information, or the relay UE 14 explicitly indicates to the remote UE 24 that there has been no change in the area specific system information or update to the system information. Furthermore, if the area specific system information is the same in the cell 402 to which the remote UE 24 has moved then there is no change or update of the system information required and so again the relay UE 24 either does nothing or signals to the remote UE 24 that there is no change in the system information.

In some examples, the relay UE 24 can transmit a request for system information to the gNB/TRP 10 with an indication of the second cell 412 formed by the second gNB/TRP 402, which may be the cell ID of the second cell 412 received from the remote UE 24. The first gNB/TRP 402 can use the cell ID to identify the second cell 412 and to send a request for the system information to the second gNB/TRP 402. The first gNB/TRP 10 can receive back from the second gNB/TRP 402 the system information, including the area specific system information with an indication of the system information area (systeminformationAreaID). The gNB/TRP10 can then transmit the area specific system information with the indication of the system information area to the relay UE 14. The relay UE 14 can then determine whether the system information area of the second cell 412 is the same or different to the first cell 400 and based on whether the system information areas or the same or different respond to the request by transmitting the area specific system information or not.

Therefore according to this second scenario, and according to example embodiments, the relay UE 14 and its serving infrastructure equipment gNB/TRP1 10 are configured to acquire system information required by the remote UE 24. If the system information/SIBs required by the remote UE 24 are area specific, and if the relay UE or remote UE moves or are in a different cell, then the relay UE 14 should monitor the system information including the SIBs, which are required by the remote UEs and acquire the system information from its serving gNB/TRP. If the remote UE 24 is attached to a cell in a different area of the radio network, then the relay UE 14 transmits a request for this area specific system information to the gNB/TRP1 10 forming the cell 400. The gNB/TRP1 10 acquires the system information from the gNB/TRP2 402 forming the cell in which the remote UE 24 is located by communicating via the Xn interface 420.

There are various ways in which the remote UE 24 can detect the cell and therefore the part of the radio network of the cell in which the remote UE 24 is located. For example, because the remote UE 24 is within coverage, it may be able to detect a cell specific identifier of the cell in which it is located, such as for example a physical cell identity (PCI) which is a layer 1 signal. However, the remote UE may not be able to transmit uplink communications to the gNB/TRP and so needs to rely on the relay UE to acquire the system information. The remote UE 24 may therefore transmit the PCI it can detect to the relay UE 14. In another example, the remote UE may receive from the relay UE, before it moves, an indication of the neighbouring cells. If the remote UE detects that it is in a new cell it can determine or estimate the cell it is located from a list of neighbour cells communicated from the relay UE and request the area specific system information for that cell.

In other examples, the relay UE may not be able to camp on to or receive system information from a cell where the remote UE has camped on. The remote UE may be able to receive a downlink master information block and SIB1 from the cell where it has camped on but unable to transmit a system information request on the uplink and so uses the relay UE to access the system information according to the example embodiments. In this case, the remote UE can send a request for system information to the relay UE either using a Physical Random Access Channel (PRACH) preamble or Message 3 (msg3) of a RACH procedure or using RRC signalling communicated via the sidelink interface (PC5-RRC). The relay UE can then acquire the system information from a neighbouring cell as explained above via its serving gNB/TRP, and the serving gNB/TRP communicating via the Xn interface with its neighbouring gNB/TRP.

As with the first example, after the relay UE has received the system information (SIB), this can be communicated to the remote UE using any of the examples explained above for the example embodiment of FIG. 6 (RRC signalling via the PC interface or broadcast itself).

An example embodiment illustrating operations of a relay device, a remote device and an infrastructure equipment (gNB/TRP) is provided by a part message diagram part flow diagram shown in FIG. 7. FIG. 7 is summarised as follows:

As a first step S800, the remote device 24 detects that it needs to acquire the system information of a cell in which it is currently located. The remote device 24 may not be able to detect the system information of the cell transmitted by an infrastructure equipment (gNB/TRP) forming the cell. However, it may be able to detect or determine information identifying the cell either from information broadcast by the gNB/TRP or from pre-configured information, for example received from another gNB/TRP identifying its neighbouring cells, from which the remote device can estimate its cell. As part of the process step S800, the remote device may transmit a request for system information to a relay device 14, represented by arrow 800, via a sidelink interface (PC5) between the remote device 24 and the relay device 14. The request 800 for the system information received from the remote device includes, according to one example, an indication of a cell of a radio network part of the wireless communications network for which the remote device 24 is requesting the system information, and the required SIBs. This is because the remote device 24 may not be aware of a cell via which the relay device 14 can transmit or receive data. The relay device can act as a relay device for the remote device 24 by transmitting and receiving signals via a wireless access interface of a cell formed by an infrastructure equipment, which may be referred to as a first infrastructure equipment forming a first cell of the radio network. The remote device is requesting system information for a second cell formed by a second infrastructure equipment. The first cell and the second cell formed by the first infrastructure equipment and the second infrastructure equipment may be the same or different.

At step S802, the relay device identifies, from the indication of the second cell for which the remote device is requesting the system information, whether an area of the radio network of the wireless communications network of which the second cell forms part is the same as an area of the radio network of the first cell. Thus the remote device may also determine whether the system information needs to be updated, either because it has already communicated system information for the current first cell, and the remote device is still within a coverage area of the first cell (the second cell identified in the request being the same as the first cell), or the system information has not changed since the last request either if the first and second cells are the same or different. However according to example embodiments, even if the remote device has moved to a different cell (the second cell is different), the remote device may still be in the same area of the radio network, via which the relay device can transmit the data to or receive the data from the wireless communications network. If the system information has not changed, either because this has not changed or because the second cell is in the same area of the radio network as the first cell, then the relay device may conclude that it does not need to respond to the request for system information. In one example the relay device 14 may not respond, which, after a pre-configured time has elapsed, the remote device recognises as a non-response and so the system information has not changed. In another example the relay device 24 explicitly indicates that the system information has not changed and/or that no response is required by a message 804.

If the relay device 14 identifies that the second cell, for which the remote device 24 is requesting system information is for a different area of the radio network to the first cell and not previously communicated to the remote device, at step S806, the relay device determines that is should respond to the request from the remote device. In step S806 the relay device transmits a request message 806. The relay device 14 transmits the request message 806 for the system information for the remote device 24 to the first gNB/TRP in the first cell, the request message 806 indicating the second cell for which the remote device is requesting the system information.

At step S808 first gNB/TRP in the first cell receives the request message 806 and identifies from the request message 806 that it does not have the system information, since this relates to a different area of the radio network. The first gNB/TRP in the first cell retrieves the system information for the second cell by transmitting a request for the system information to the second gNB/TRP via an Xn interface between the first gNB/TRP and the gNB/TRP. The first gNB/TRP received the requested system information back from the second gNB/TRP, and transmits a message 808 which includes the requested system information of the second cell to the relay device.

At step S810, the relay device 14 responds to the request from the remote device by transmitting a message 810 which includes the requested system information for the second cell. At step S812, the remote device 24 receives the system information for the second cell from the relay device 14 so that it can transmit and receive data to the relay device whilst the remote device 24 is within a coverage area of the second cell.

According to an example embodiment there is provided a method of operating a communications device, comprising detecting from signals received by the communications device from within a coverage area of a cell of a radio network part of a wireless communications network, identifying from the received signals from the cell an indication of an identifier of the cell, and transmitting a request for system information to another communications device via a sidelink interface between the communications device and the other communications device. The other communications device is acting as a relay device for the communications device as a remote device, the communications device as the remote device being configured for transmitting data to or receiving data from the wireless communications network via the relay device. The relay device is configured for transmitting the data to or receiving the data from a radio network infrastructure equipment forming a cell of the wireless communications network via which cell the relay device can transmit the data to or receive the data from the wireless communications network. The request for the system information includes the indication of the cell identifier for which the remote device is requesting the system information, and the method includes receiving a response to the request for the system information from the other communications device acting as the relay device in accordance with whether a system information area of the radio network of the cell for which the communications device as the remote device is requesting the system information is different to a system information area of the cell of the radio network part via which the relay device can transmit the data to or receive the data from the wireless communications network.

According to another embodiment there is provided a communications device operating to communicate via a wireless communications network, the communications device comprising transmitter circuitry configured for transmitting signals via a wireless access interface provided by a radio network infrastructure equipment of a wireless communications network and for transmitting signals via a sidelink interface to another communications device between the communications device and the other communications device. The communications device also comprises receiver circuitry configured for receiving signals transmitted from the radio network infrastructure equipment via the wireless access interface and for receiving signals transmitted via the sidelink interface from the other communications device, and controller circuitry configured to control the transmitter circuitry and the receiver circuitry. The controller circuitry is configured with the receiver circuitry to receive a request for system information from the other communications device transmitted via the sidelink interface, the communications device acting as a relay device for the other communications device as a remote device, via which relay device the remote device can transmit data to or receive data from the radio network infrastructure equipment of the wireless communications network, forming a cell of the wireless communications network, via which cell the relay device can transmit the data to or receive the data from the wireless communications network. The request for the system information received from the remote device includes an indication of a cell of a radio network part of the wireless communications network for which the remote device is requesting the system information. The controller circuit is configured to identify, from the indication of the cell for which the remote device is requesting the system information, whether a system information area of the radio network part of the wireless communications network of which the cell for which the remote device is requesting the system information is the same as a system information area of the radio network part of the cell, via which the relay device can transmit the data to or receive the data from the wireless communications network, and to determine whether to respond to the request for the system information based on whether the system information areas of the relay device and the remote device are the same or different.

According to another embodiment there is provided an infrastructure equipment for forming part of a radio network of a wireless communications network, the infrastructure equipment comprising transmitter circuitry configured for transmitting signals via a wireless access interface provided by the infrastructure equipment to one or more communications devices, receiver circuitry configured for receiving signals transmitted via the wireless access interface from the one of more communications devices, and controller circuitry configured to control the transmitter circuitry and the receiver circuitry. The controller circuitry is configured with the receiver circuitry to receive a request for system information from one of the communications devices acting as a relay device for another communications device as a remote device to transmit data to or receive data from the wireless communications network. The request for the system information is transmitted by the relay device via the wireless access interface provided by the infrastructure equipment forming a first cell of the radio network of the wireless communications network, and via which first cell the relay device can transmit the data to or receive the data from the infrastructure equipment forming the first cell, the infrastructure equipment being a first infrastructure equipment. The request for the system information for the remote device includes an indication of a second cell of the radio network for which the remote device is requesting the system information, the second cell being formed by a second infrastructure equipment in a different second area of the radio network to a first area of which the first cell forms part. The controller circuitry is configured to retrieve the system information for the second cell, the system information including area specific system information, which is specific to the second area, and to control the transmitter circuitry to transmit the system information in response to the request to the communications device acting as the relay device for transmission to the other communications device as the remote device.

According to another embodiment there is provided a communications device comprising transmitter circuitry configured for transmitting signals via a sidelink interface to another communications device between the communications device and the other communications device, receiver circuitry configured for receiving signals transmitted from a radio network infrastructure equipment of a wireless communications network via a wireless access interface provided by the radio network infrastructure equipment and for receiving signals transmitted via the sidelink interface from the other communications device, and controller circuitry configured to control the transmitter circuitry and the receiver circuitry. The controller circuitry is configured with the receiver circuitry to detect from signals received by the communications device from within a coverage area of a cell formed by a radio network infrastructure equipment, and to identify, from the received signals from the cell, an indication of an identifier of the cell. The controller circuitry is configured to control the transmitter circuitry to transmit a request for system information to the other communications device via the sidelink interface, the other communications device acting as a relay device for the communications device as a remote device, the communications device as the remote device being configured for transmitting data to or receiving data from the wireless communications network via the relay device, the relay device being configured for transmitting the data to or receiving the data from a radio network infrastructure equipment forming a cell of the wireless communications network via which cell the relay device can transmit the data to or receive the data from the wireless communications network. The request for the system information includes the indication of the cell identifier for which the remote device is requesting the system information. The control circuitry is configured to control the receiver circuitry to receive a response to the request for the system information from the other communications device acting as the relay device in accordance with whether a system information area of the radio network of the cell for which the communications device as the remote device is requesting the system information is different to a system information area of the cell of the radio network part via which the relay device can transmit the data to or receive the data from the wireless communications network.

Corresponding apparatus and circuitry have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communications devices/IoT devices, but can be applied more generally, for example in respect of any type of sidelink providing a wireless link to a communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device, the method comprising
receiving a request for system information from another communications device via a sidelink interface between the communications device and the other communications device, the communications device acting as a relay device for the other communications device as a remote device, via which relay device the remote device can transmit data to or receive data from a radio network infrastructure equipment of a wireless communications network, the radio network infrastructure equipment forming a cell of the wireless communications network via which cell the relay device can transmit the data to or receive the data from the wireless communications network, the request for the system information received from the remote device including an indication of a cell of a radio network part of the wireless communications network for which the remote device is requesting the system information, identifying, from the indication of the cell for which the remote device is requesting the system information, whether a system information area of the radio network part of the wireless communications network of which the cell for which the remote device is requesting the system information is the same as or different to a system information area of the radio network part of the cell, via which the relay device can transmit the data to or receive the data from the wireless communications network, and determining whether to respond to the request for the system information based on whether the system information areas of the relay device and the remote device are the same or different.

Paragraph 2. A method of paragraph 1, wherein the determining whether to respond to the request for the system information based on whether the system information areas of the relay device and the remote device are the same or different includes identifying that the system information area of the radio network of the cell for which the remote device is requesting the system information is different to the system information area of the cell of the radio network part, via which the relay device can transmit the data to or receive the data from the wireless communications network, the cell of the radio network part, via which the relay device can transmit the data to or receive the data from the wireless communications network being a first cell formed by the radio network infrastructure equipment as a first infrastructure equipment of the radio network, and the cell for which the remote device is requesting the system information being a second cell formed by a second infrastructure equipment of the radio network.

Paragraph 3. A method of paragraph 2, wherein the method comprises transmitting the request for the system information for the remote device to the first infrastructure equipment of the radio network of the wireless communications network via a wireless access interface provided by the first infrastructure equipment, the request indicating the second cell for which the remote device is requesting the system information, receiving the system information for the other communications device as the remote device from the wireless communications network via the wireless access interface of the first infrastructure equipment, and transmitting the system information to the other communications device as the remote device, the system information including area specific system information related to the system information area of the radio network of which the second cell for which the remote device is requesting the system information forms part.

Paragraph 4. A method of paragraph 3, wherein the transmitting the system information to the other communications device as the remote device comprises transmitting the system information via the sidelink wireless communications interface.

Paragraph 5. A method of paragraph 4, wherein the transmitting the system information to the other communications device as the remote device comprises transmitting the system information via the sidelink wireless communications interface using radio resource control signalling, or user plane or PDCP/RLC/MAC control signalling.

Paragraph 6. A method of paragraph 3, wherein the transmitting the system information to the other communications device as the remote device comprises broadcasting the system information via a broadcast channel of the sidelink wireless communications interface to the remote device and one or more other communications devices as other remote devices.

Paragraph 7. A method of paragraph 2, wherein the method comprises transmitting the request for the system information for the remote device to the first infrastructure equipment of the radio network of the wireless communications network via a wireless access interface provided by the first infrastructure equipment, the request indicating the second cell for which the remote device is requesting the system information, receiving scheduling information defining a time and frequency communications resources of the wireless access interface provided by the second infrastructure equipment forming the second cell in which the system information requested by the other the remote device will be transmitted by the second infrastructure equipment and can be received by the remote device, and transmitting the scheduling information for receiving the system information to the remote device, the system information including area specific system information related to the system information area of the radio network of which the second cell for which the remote device is requesting the system information forms part.

Paragraph 8. A method of any of paragraphs 2 to 7, wherein the system information requested by the remote device comprises one or more system information blocks, SIBs, and the request from the remote device indicates a request for an update of one or more of the SIBs, the transmitting the request for the system information for the remote device to the first infrastructure equipment includes transmitting the request indicating the second cell for which the remote device is requesting the system information and the one or more of the SIBs which are requested to be updated, and the receiving the system information for the remote device includes receiving the one or more of the updated SIBs requested to be updated, and the transmitting the system information to the remote device includes transmitting the one or more updated SIBs to the remote device, the system information including the one or more updated SIBs which include area specific system information related to the system information area of the radio network of which the second cell for which the remote device is requesting the system information forms part.

Paragraph 9. A method of any of paragraphs 1 to 8, wherein the receiving, by the communications device acting as the relay device for the remote device, the request for the system information from the remote device via a sidelink interface comprises receiving the request as one of a random access message of a physical random access channel procedure or by radio resource control signalling of the sidelink interface.

Paragraph 10. A method of any of paragraphs 1 to 8, wherein the determining whether to respond to the request for the system information based on whether the system information areas of the relay device and the remote device are the same or different, includes
determining whether the cell of the system information requested by the remote device has changed since a last transmission of the requested system information by the relay device to the remote device based on whether the areas of the relay device and the remote device are the same or different, and if the cell has changed
transmitting the system information to the remote device, or if the cell of the system information has not changed
not responding to the request for the system information by the remote device.

Paragraph 11. A method of any of paragraphs 1 to 8, wherein the determining whether to respond to the request for the system information based on whether the system information areas of the relay device and the remote device are the same or different, includes
determining whether the system information for the cell requested by the remote device has changed since a last transmission of the requested system information for the cell by the relay device to the remote device based on whether the system information areas of the relay device and the remote device are the same or different, and if the system information has changed
transmitting the system information to the remote device, or if the system information for the cell has not changed
not responding to the request for the system information by the remote device.

Paragraph 12. A method of any of paragraphs 1 to 11, wherein the determining whether to respond to the request for the system information based on whether the system information areas of the relay device and the remote device are the same or different, includes
responding to the request if the system information areas of the relay device and the remote device are different by transmitting the system information to the remote device, or either
not responding to the request if the system information areas of the relay device and the remote device are the same, or
responding to the request if the system information areas of the relay device and the remote device are the same by transmitting an indication that the remote device already has received current system information from the relay device for the area.

Paragraph 13. A method of any of paragraphs 2 to 12, wherein the identifying, from the indication of the cell for which the remote device is requesting the system information, whether the system information area of the second cell for which the remote device is requesting the system information is the same as or different to the system information area of the first cell via which the relay device can transmit the data to or receive the data from the wireless communications network comprises
transmitting the request for the system information for the remote device to the first infrastructure equipment, the request indicating the second cell for which the remote device is requesting the system information,
receiving in response to the request for the system information, the system information for the second cell requested by the remote device, and an indication of the system information area of the second cell for which the remote device is requesting the system information, and
identifying whether the system information areas of the relay device and the remote device are the same or different from the received indication of the system information area of the second cell and a system information area of the first cell received from the first infrastructure equipment.

Paragraph 14. A method of operating an infrastructure equipment of a radio network part of a wireless communications network, the method comprising
receiving a request for system information from a communications device acting as a relay device for another communications device as a remote device to transmit data to or receive data from the wireless communications network, the request being transmitted by the relay device via a wireless access interface provided by the infrastructure equipment forming a first cell of the radio network, and via which wireless access interface the relay device can transmit the data to or receive the data from the infrastructure equipment forming the first cell, the infrastructure equipment being a first infrastructure equipment, and the request for the system information for the remote device including an indication of a second cell of the radio network for which the remote device is requesting the system information, the second cell being formed by a second infrastructure equipment in a different second area of the radio network to a first area of which the first cell forms part,
retrieving the system information for the second cell, the system information including area specific system information, which is specific to the second area, and
transmitting in response to the request to the communications device acting as the relay device information for transmission to the other communications device as the remote device from which the remote device can determine the system information for the second cell.

Paragraph 15. A method of paragraph 14, wherein the retrieving the system information for the second cell comprises
transmitting a request for the system information to the second infrastructure equipment via an interface between the first infrastructure equipment and the second infrastructure equipment, and
receiving the system information for the second cell from the second infrastructure equipment via the interface between the first infrastructure equipment and the second infrastructure equipment.

Paragraph 16. A method of paragraph 14 or 15, wherein the system information requested by the remote device comprises one or more system information blocks, SIBs, and the receiving the request for system information from the relay device for the remote device, comprises
receiving a request for an update of one or more of the SIBs for the remote device, transmitted by the relay device via the wireless access interface of the first cell, and the retrieving the system information comprises transmitting a request for the updated one or more SIBs for the remote device to the second infrastructure equipment via the interface between the first infrastructure equipment and the second infrastructure equipment, and receiving the updated one or more SIBs for the remote device for the second cell from the second infrastructure equipment via the interface between the first infrastructure equipment and the second infrastructure equipment, and the transmitting the system information in response to the request comprises transmitting the updated one or more SIBs for the remote device for the second cell in response to the request to the relay device for transmission to the remote device.

Paragraph 17. A method of paragraphs 13, 14 or 15, wherein the transmitting the request for the system information to the second infrastructure equipment via the interface between the first infrastructure equipment and the second infrastructure equipment, comprises transmitting the request for the system information to the second infrastructure equipment with the indication identifying the second cell received from the relay device, and the receiving the system information for the second cell from the second infrastructure equipment includes receiving an indication identifying the system information area of the second cell, and the method includes transmitting the identifier of the system information area of the second cell to the relay device or an indication that the system information area of the first cell is the same as the second cell.

Paragraph 18. A method of operating a communications device, the method comprising detecting from signals received by the communications device from within a coverage area of a cell of a radio network part of a wireless communications network, identifying from the received signals from the cell an indication of an identifier of the cell, transmitting a request for system information to another communications device via a sidelink interface between the communications device and the other communications device, the other communications device acting as a relay device for the communications device as a remote device, the communications device as the remote device being configured for transmitting data to or receiving data from the wireless communications network via the relay device, the relay device being configured for transmitting the data to or receiving the data from a radio network infrastructure equipment forming a cell of the wireless communications network via which the relay device can transmit the data to or receive the data from the wireless communications network, the request for the system information including the indication of the cell identifier for which the remote device is requesting the system information, and receiving a response to the request for the system information from the other communications device acting as the relay device in accordance with whether a system information area of the radio network of the cell for which the communications device as the remote device is requesting the system information is different to a system information area of the cell of the radio network part via which the relay device can transmit the data to or receive the data from the wireless communications network.

Paragraph 19. A method of paragraph 18, wherein the system information area of the radio network of the cell for which the communications device as the remote device is requesting the system information is different to the system information area of the cell of the radio network part via which the relay device can transmit the data to or receive the data from the wireless communications network, the cell of the radio network part, via which the relay device can transmit the data to or receive the data from the wireless communications network being a first cell formed by the radio network infrastructure equipment as a first infrastructure equipment of the radio network, and the cell for which the communications device as the remote device is requesting the system information is a second cell formed by a second infrastructure equipment of the radio network, and the receiving the response to the request for the system information from the other communications device acting as the relay device comprises receiving the system information for the second cell, the system information area of the second cell being different to the system information area of the first cell, the system information including area specific system information related to the system information area of the radio network of which the second cell forms part.

Paragraph 20. A method of paragraph 19, wherein the receiving the system information for the second cell comprises receiving the system information for the second cell from the relay device via the sidelink interface.

Paragraph 21. A method of paragraph 19, wherein the receiving the system information for the second cell comprises receiving receiving scheduling information defining a time and frequency communications resources of the wireless access interface provided by the second infrastructure equipment forming the second cell in which the system information requested by the communications device as the remote device will be transmitted by the second infrastructure equipment and from which the system information can be received by the communications device, and receiving the system information from the second infrastructure equipment.

Paragraph 22. A method of paragraph 19, 20 or 21, wherein the system information requested by the communications device comprises one or more system information blocks, SIBs, and the transmitting the request for system information to relay device comprises transmitting a request indicating a request for an update of one or more of the SIBs, and the receiving the system information for the second cell comprises receiving the one or more updated SIBs from the relay device, the one or more updated SIBs including the area specific system information related to the system information area of the radio network of which the second cell forms part.

Paragraph 23. A method of paragraph 18, wherein the system information area of the radio network of the cell for which the communications device as the remote device is requesting the system information is the same as the system information area of the cell of the radio network part via which the relay device can transmit the data to or receive the data from the wireless communications network, and the receiving the response to the request for the system information from the other communications device acting as the relay device comprises either not receiving a response to the request for the system information, the system information being for the same system information area, or receiving a response to the request for the system information indicating that the system information requested is for the same system information area as system information already received from the relay device.

Paragraph 24. A method of paragraph 23, wherein the cell of the radio network part, via which the relay device can transmit the data to or receive the data from the wireless communications network is a first cell formed by the radio network infrastructure equipment as a first infrastructure equipment of the radio network, and the cell for which the communications device as the remote device is requesting the system information is a second cell formed by a second infrastructure equipment of the radio network, and the system information area of the first cell being the same as the system information of the second cell.

Paragraph 25. A method of paragraph 23, wherein the cell of the radio network part, via which the relay device can transmit the data to or receive the data from the wireless communications network is the same cell formed by the radio network infrastructure equipment as the cell for which the communications device as the remote device is requesting the system information.

Paragraph 26. A method of any of paragraphs 18 to 25, wherein the transmitting, by the communications device as the remote device to the relay device, the request for the system information from the remote device via a sidelink interface comprises transmitting the request as one of a random access message of a physical random access channel procedure or by radio resource control signalling of the sidelink interface.

Paragraph 27. A method of any of paragraphs 1 to 26, wherein the indication of the cell of the radio network part of the wireless communications network for which the remote device is requesting the system information includes either a cell identifier or a radio network terminal identifier, RNTI.

Paragraph 28. A communications device operating to communicate via a wireless communications network, the communications device comprising transmitter circuitry configured for transmitting signals via a wireless access interface provided by a radio network infrastructure equipment of a wireless communications network and for transmitting signals via a sidelink interface to another communications device between the communications device and the other communications device, receiver circuitry configured for receiving signals transmitted from the radio network infrastructure equipment via the wireless access interface and for receiving signals transmitted via the sidelink interface from the other communications device, and controller circuitry configured to control the transmitter circuitry and the receiver circuitry, the controller circuitry being configured with the receiver circuitry to receive a request for system information from the other communications device transmitted via the sidelink interface, the communications device acting as a relay device for the other communications device as a remote device, via which relay device the remote device can transmit data to or receive data from the radio network infrastructure equipment of the wireless communications network, forming a cell of the wireless communications network, via which cell the relay device can transmit the data to or receive the data from the wireless communications network, the request for the system information received from the remote device including an indication of a cell of a radio network part of the wireless communications network for which the remote device is requesting the system information, and the controller circuit is configured to identify, from the indication of the cell for which the remote device is requesting the system information, whether a system information area of the radio network part of the wireless communications network of which the cell for which the remote device is requesting the system information is the same as a system information area of the radio network part of the cell, via which the relay device can transmit the data to or receive the data from the wireless communications network, and to determine whether to respond to the request for the system information based on whether the system information areas of the relay device and the remote device are the same or different.

Paragraph 29. An infrastructure equipment for forming part of a radio network of a wireless communications network, the infrastructure equipment comprising transmitter circuitry configured for transmitting signals via a wireless access interface provided by the infrastructure equipment to one or more communications devices, receiver circuitry configured for receiving signals transmitted via the wireless access interface from the one or more communications devices, and controller circuitry configured to control the transmitter circuitry and the receiver circuitry, the controller circuitry being configured with the receiver circuitry to receive a request for system information from one of the communications devices acting as a relay device for another communications device as a remote device to transmit data to or receive data from the wireless communications network, the request for the system information being transmitted by the relay device via the wireless access interface provided by the infrastructure equipment forming a first cell of the radio network of the wireless communications network, and via which first cell the relay device can transmit the data to or receive the data from the infrastructure equipment forming the first cell, the infrastructure equipment being a first infrastructure equipment, and the request for the system information for the remote device including an indication of a second cell of the radio network for which the remote device is requesting the system information, the second cell being formed by a second infrastructure equipment in a different second area of the radio network to a first area of which the first cell forms part, the controller circuitry being configured to retrieve the system information for the second cell, the system information including area specific system information, which is specific to the second area, and to control the transmitter circuitry to transmit the system information in response to the request to the communications device acting as the relay device for transmission to the other communications device as the remote device.

Paragraph 30. A communications device comprising
transmitter circuitry configured for transmitting signals via a sidelink interface to another communications device between the communications device and the other communications device, receiver circuitry configured for receiving signals transmitted from a radio network infrastructure equipment of a wireless communications network via a wireless access interface provided by the radio network infrastructure equipment and for receiving signals transmitted via the sidelink interface from the other communications device, and controller circuitry configured to control the transmitter circuitry and the receiver circuitry, the controller circuitry being configured with the receiver circuitry to detect from signals received by the communications device from within a coverage area of a cell formed by a radio network infrastructure equipment, to identify, from the received signals from the cell, an indication of an identifier of the cell, and the controller circuitry is configured to control the transmitter circuitry to transmit a request for system information to the other communications device via the sidelink interface, the other communications device acting as a relay device for the communications device as a remote device, the communications device as the remote device being configured for transmitting data to or receiving data from the wireless communications network via the relay device, the relay device being configured for transmitting the data to or receiving the data from a radio network infrastructure equipment forming a cell of the wireless communications network via which cell the relay device can transmit the data to or receive the data from the wireless communications network, the request for the system information including the indication of the cell identifier for which the remote device is requesting the system information, and to control the receiver circuitry to receive a response to the request for the system information from the other communications device acting as the relay device in accordance with whether a system information area of the radio network of the cell for which the communications device as the remote device is requesting the system information is different to a system information area of the cell of the radio network part via which the relay device can transmit the data to or receive the data from the wireless communications network.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2(Release 15)", June 2018

[2] Holma H. and Toskala A, "LTE for UMTS OFDMA and SC-FDMA based radio access", John Wiley and Sons, 2009

[3] TR36.746 V1.1.0

What is claimed is:

1. A method of operating a communications device, the method comprising receiving a request for system information from another communications device via a sidelink interface between the communications device and the other communications device, the communications device acting as a relay device for the other communications device as a remote device, via which relay device the remote device can transmit data to or receive data from a radio network infrastructure equipment of a wireless communications network, the radio network infrastructure equipment forming a cell of the wireless communications network via which cell the relay device can transmit the data to or receive the data from the wireless communications network, the request for the system information received from the remote device including an indication of a cell of a radio network part of the wireless communications network for which the remote device is requesting the system information, identifying, from the indication of the cell for which the remote device is requesting the system information, whether a system information area of the radio network part of the wireless communications network of which the cell for which the remote device is requesting the system information is the same as or different to a system information area of the radio network part of the cell, via which the relay device can transmit the data to or receive the data from the wireless communications network, and determining whether to respond to the request for the system information based on whether the system information areas of the relay device and the remote device are the same or different.

2. A method of claim 1, wherein the determining whether to respond to the request for the system information based on whether the system information areas of the relay device and the remote device are the same or different includes identifying that the system information area of the radio network of the cell for which the remote device is requesting the system information is different to the system information area of the cell of the radio network part, via which the relay device can transmit the data to or receive the data from the wireless communications network, the cell of the radio network part, via which the relay device can transmit the data to or receive the data from the wireless communications network being a first cell formed by the radio network infrastructure equipment as a first infrastructure equipment of the radio network, and the cell for which the remote device is requesting the system information being a second cell formed by a second infrastructure equipment of the radio network.

3. A method of claim 2, wherein the method comprises
transmitting the request for the system information for the remote device to the first infrastructure equipment of the radio network of the wireless communications network via a wireless access interface provided by the first infrastructure equipment, the request indicating the second cell for which the remote device is requesting the system information, receiving the system information for the other communications device as the remote device from the wireless communications network via the wireless access interface of the first infrastructure equipment, and transmitting the system information to the other communications device as the remote device, the system information including area specific system information related to the system information area of the radio network of which the second cell for which the remote device is requesting the system information forms part.

4. A method of claim 3, wherein the transmitting the system information to the other communications device as the remote device comprises transmitting the system information via the sidelink wireless communications interface.

5. A method of claim 4, wherein the transmitting the system information to the other communications device as the remote device comprises transmitting the system information via the sidelink wireless communications interface using radio resource control signalling, or user plane or PDCP/RLC/MAC control signalling.

6. A method of claim 3, wherein the transmitting the system information to the other communications device as the remote device comprises broadcasting the system information via a broadcast channel of the sidelink wireless communications interface to the remote device and one or more other communications devices as other remote devices.

7. A method of claim 2, wherein the method comprises transmitting the request for the system information for the remote device to the first infrastructure equipment of the radio network of the wireless communications network via a wireless access interface provided by the first infrastructure equipment, the request indicating the second cell for which the remote device is requesting the system information, receiving scheduling information defining a time and frequency communications resources of the wireless access interface provided by the second infrastructure equipment forming the second cell in which the system information requested by the other the remote device will be transmitted by the second infrastructure equipment and can be received by the remote device, and transmitting the scheduling information for receiving the system information to the remote device, the system information including area specific system information related to the system information area of the radio network of which the second cell for which the remote device is requesting the system information forms part.

8. A method of claim 2, wherein the system information requested by the remote device comprises one or more system information blocks, SIBs, and the request from the remote device indicates a request for an update of one or more of the SIBs, the transmitting the request for the system information for the remote device to the first infrastructure equipment includes transmitting the request indicating the second cell for which the remote device is requesting the system information and the one or more of the SIBs which are requested to be updated, and the receiving the system information for the remote device includes receiving the one or more of the updated SIBs requested to be updated, and the transmitting the system information to the remote device includes transmitting the one or more updated SIBs to the remote device, the system information including the one or more updated SIBs which include area specific system information related to the system information area of the radio network of which the second cell for which the remote device is requesting the system information forms part.

9. A method of claim 2, wherein the identifying, from the indication of the cell for which the remote device is requesting the system information, whether the system information area of the second cell for which the remote device is requesting the system information is the same as or different to the system information area of the first cell via which the relay device can transmit the data to or receive the data from the wireless communications network comprises transmitting the request for the system information for the remote device to the first infrastructure equipment, the request indicating the second cell for which the remote device is requesting the system information, receiving in response to the request for the system information, the system information for the second cell requested by the remote device, and an indication of the system information area of the second cell for which the remote device is requesting the system information, and identifying whether the system information areas of the relay device and the remote device are the same or different from the received indication of the system information area of the second cell and a system information area of the first cell received from the first infrastructure equipment.

10. A method of claim 9, wherein the transmitting the request for the system information to the second infrastructure equipment via the interface between the first infrastructure equipment and the second infrastructure equipment, comprises transmitting the request for the system information to the second infrastructure equipment with the indication identifying the second cell received from the relay device, and the receiving the system information for the second cell from the second infrastructure equipment includes receiving an indication identifying the system information area of the second cell, and the method includes transmitting the identifier of the system information area of the second cell to the relay device or an indication that the system information area of the first cell is the same as the second cell.

11. A method of claim 1, wherein the receiving, by the communications device acting as the relay device for the remote device, the request for the system information from the remote device via a sidelink interface comprises receiving the request as one of a random access message of a physical random access channel procedure or by radio resource control signalling of the sidelink interface.

12. A method of claim 1, wherein the determining whether to respond to the request for the system information based on whether the system information areas of the relay device and the remote device are the same or different, includes determining whether the cell of the system information requested by the remote device has changed since a last transmission of the requested system information by the relay device to the remote device based on whether the areas of the relay device and the remote device are the same or different, and if the cell has changed transmitting the system information to the remote device, or if the cell of the system information has not changed not responding to the request for the system information by the remote device.

13. A method of claim 1, wherein the determining whether to respond to the request for the system information based on whether the system information areas of the relay device and the remote device are the same or different, includes
    determining whether the system information for the cell requested by the remote device has changed since a last transmission of the requested system information for the cell by the relay device to the remote device based on whether the system information areas of the relay device and the remote device are the same or different, and if the system information has changed
    transmitting the system information to the remote device, or if the system information for the cell has not changed
    not responding to the request for the system information by the remote device.

14. A method of claim 1, wherein the determining whether to respond to the request for the system information based on whether the system information areas of the relay device and the remote device are the same or different, includes
    responding to the request if the system information areas of the relay device and the remote device are different by transmitting the system information to the remote device, or either
    not responding to the request if the system information areas of the relay device and the remote device are the same, or
    responding to the request if the system information areas of the relay device and the remote device are the same by transmitting an indication that the remote device already has received current system information from the relay device for the area.

15. A method of operating an infrastructure equipment of a radio network part of a wireless communications network, the method comprising
    receiving a request for system information from a communications device acting as a relay device for another communications device as a remote device to transmit data to or receive data from the wireless communications network, the request being transmitted by the relay device via a wireless access interface provided by the infrastructure equipment forming a first cell of the radio network, and via which wireless access interface the relay device can transmit the data to or receive the data from the infrastructure equipment forming the first cell, the infrastructure equipment being a first infrastructure equipment, and the request for the system information for the remote device including an indication of a second cell of the radio network for which the remote device is requesting the system information, the second cell being formed by a second infrastructure equipment in a different second area of the radio network to a first area of which the first cell forms part,
    retrieving the system information for the second cell, the system information including area specific system information, which is specific to the second area, and
    transmitting in response to the request to the communications device acting as the relay device information for transmission to the other communications device as the remote device from which the remote device can determine the system information for the second cell.

16. A method of claim 15, wherein the retrieving the system information for the second cell comprises
    transmitting a request for the system information to the second infrastructure equipment via an interface between the first infrastructure equipment and the second infrastructure equipment, and
    receiving the system information for the second cell from the second infrastructure equipment via the interface between the first infrastructure equipment and the second infrastructure equipment.

17. A method of claim 15, wherein the system information requested by the remote device comprises one or more system information blocks, SIBs, and the receiving the request for system information from the relay device for the remote device, comprises
    receiving a request for an update of one or more of the SIBs for the remote device, transmitted by the relay device via the wireless access interface of the first cell, and the retrieving the system information comprises
    transmitting a request for the updated one or more SIBs for the remote device to the second infrastructure equipment via the interface between the first infrastructure equipment and the second infrastructure equipment, and
    receiving the updated one or more SIBs for the remote device for the second cell from the second infrastructure equipment via the interface between the first infrastructure equipment and the second infrastructure equipment, and the transmitting the system information in response to the request comprises
    transmitting the updated one or more SIBs for the remote device for the second cell in response to the request to the relay device for transmission to the remote device.

18. A communications device operating to communicate via a wireless communications network, the communications device comprising
    transmitter circuitry configured for transmitting signals via a wireless access interface provided by a radio network infrastructure equipment of a wireless communications network and for transmitting signals via a sidelink interface to another communications device between the communications device and the other communications device,
    receiver circuitry configured for receiving signals transmitted from the radio network infrastructure equipment via the wireless access interface and for receiving signals transmitted via the sidelink interface from the other communications device, and
    controller circuitry configured to control the transmitter circuitry and the receiver circuitry, the controller circuitry being configured with the receiver circuitry
    to receive a request for system information from the other communications device transmitted via the sidelink interface, the communications device acting as a relay device for the other communications device as a remote device, via which relay device the remote device can transmit data to or receive data from the radio network infrastructure equipment of the wireless communications network, forming a cell of the wireless communications network, via which cell the relay device can transmit the data to or receive the data from the wireless communications network, the request for the system information received from the remote device including an indication of a cell of a radio network part of the wireless communications network for which the remote device is requesting the system information, and the controller circuit is configured
    to identify, from the indication of the cell for which the remote device is requesting the system information, whether a system information area of the radio network part of the wireless communications network of which the cell for which the remote device is requesting the system information is the same as a system information area of the radio network part of the cell, via which the relay device can transmit the data to or receive the data from the wireless communications network, and to determine whether to respond to the request for the system information based on whether the system information areas of the relay device and the remote device are the same or different.

\* \* \* \* \*